United States Patent [19]

Hannam

[11] 3,950,386

[45] Apr. 13, 1976

[54] CYCLIC COMPOUNDS SYNTHESIS

[75] Inventor: Stephen J. Hannam, Thackley, England

[73] Assignee: Sun Chemical Corporation, New York, N.Y.

[22] Filed: Apr. 19, 1974

[21] Appl. No.: 462,318

[30] Foreign Application Priority Data

Feb. 21, 1973 United Kingdom................. 8554/73
Aug. 1, 1973 United Kingdom............... 36548/73

[52] U.S. Cl........ 260/468 J; 260/2.5 AV; 260/75 H; 260/75 NR; 260/859 R; 260/869; 260/468 G
[51] Int. Cl.²......................................... C07C 64/74
[58] Field of Search...................... 260/468 G, 468 J

[56] References Cited

FOREIGN PATENTS OR APPLICATIONS 6,820,170   8/1968   Japan................................. 260/468

OTHER PUBLICATIONS

Groggins, Unit Processes in Organic Synthesis, pp. 240–245, 1259–1260, 716–717 (1958).

*Primary Examiner*—Robert Gerstl
*Attorney, Agent, or Firm*—Cynthia Berlow

[57] ABSTRACT

A one-step simultaneous esterification and halogenation process results in novel compounds having flame retardant properties.

3 Claims, No Drawings

CYCLIC COMPOUNDS SYNTHESIS

It is known to be desirable to introduce halogenated, especially brominated, moieties into a polymeric molecule in order to increase its fire resistance. Thus it is known, for example from U.S. Pat. No. 3,585,254, to make a compound having the formula:

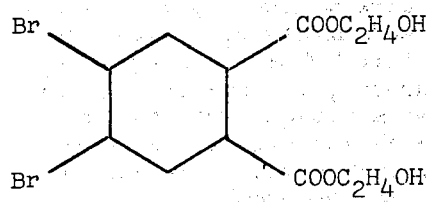

to convert this to a hydroxy carboxylic acid by reacting it with one mole of, for example, maleic anhydride, and then to use the resultant hydroxy carboxylic acid as a component of a polyester. Compounds such as the compound of the formula are generally made from the corresponding cyclo olefinic acid or anhydride in a two-stage reaction by heating one mole of the acid or anhydride with two moles of a dihydroxy alcohol and separating the ester from the water of reaction, and in a separate stage brominating the resultant ester.

According to this invention there has been devised a surprisingly simple method of making halogenated compounds that are of particular value in the manufacture of flame retardant polymers. The method is capable of producing a class of compounds, that are believed to be new, and that have the formula:

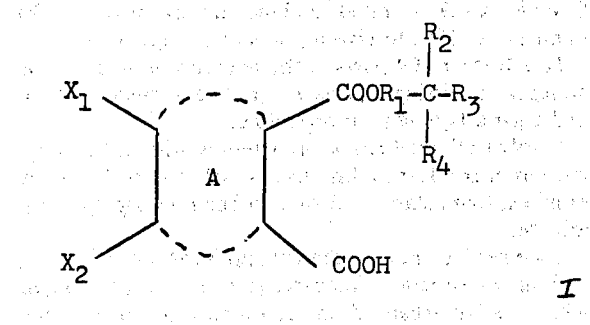

wherein $X_1$ and $X_2$ are each chlorine, bromine, iodine, or hydrogen, at least one being chlorine, bromine, or iodine; $R_1$ may be absent or it is a divalent aliphatic chain; or it, $R_2$, and the carbon atom to which it is attached together form a saturated alicyclic ring; $R_2$ and $R_3$ may be the same or different and represent hydrogen, aliphatic, alicyclic, heterocyclic, or aromatic groups; and $R_4$ represents hydrogen, hydroxy, or aliphatic, alicyclic, heterocyclic, or aromatic groups; and A is a saturated carbocyclic ring that may be further substituted and may be bridged. The ring A is most preferably a six-membered ring in which event either or both of the remaining positions in the ring may be substituted, for example by halogen, for example bromine or chlorine, or methyl, or they may be linked, for example by a methylene bridge.

$R_1$ preferably comprises an alkylene chain or an oxyalkylene chain containing from 1 to 200 oxyalkylene groups. The alkylene groups may be optionally substituted and may be straight or branched chain. Usually they contain from 1 to 20 carbon atoms, most preferably from 1 to 6 carbon atoms. The preferred values of $R_1$ are $-C_2H_4-$ and $-CH_2-$. $-R_1 CH_2-$ may also represent, for example, a cyclohexyl ring.

Heterocyclic groups represented by $R_2$, $R_3$, or $R_4$ may be for example pyridyl groups that may be substituted. Alicyclic groups represented by $R_2$, $R_3$, or $R_4$ may be for example cyclohexyl groups. Aromatic groups represented by $R_2$, $R_3$, or $R_4$ may be, for example, phenyl groups that may be substituted. Aliphatic groups represented by $R_2$, $R_3$, or $R_4$ may be, for example, alkyl groups containing 1 to 20, and most preferably 1 to 8, carbon atoms. The preferred values for $R_2$ and $R_3$ are hydrogen and $C_{1-4}$ alkyl, and the preferred values for $R_4$ are hydrogen, $C_{1-4}$ alkyl, and hydroxy. Preferred alkyl groups are methyl and ethyl.

$R_4$ preferably represents hydroxy, since the compounds are then hydroxy-carboxylic acids and can thus readily be homo- or co-polymerised. Most preferred compounds have $R_2$ and $R_3$ representing hydrogen and $R_4$ representing hydroxyl, $R_1$ preferably being $-C_2H_4-$ or $-CH_2-$.

Preferred compounds have both $X_1$ and $X_2$ representing bromine.

The process of the invention is a one-step simultaneous esterification and halogenation reaction and comprises reacting bromine, chlorine, iodine, hydrogen bromide, hydroxy chloride, or hydrogen iodide with a mixture of a compound having the formula:

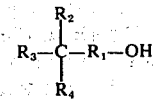

and a compound having the formula:

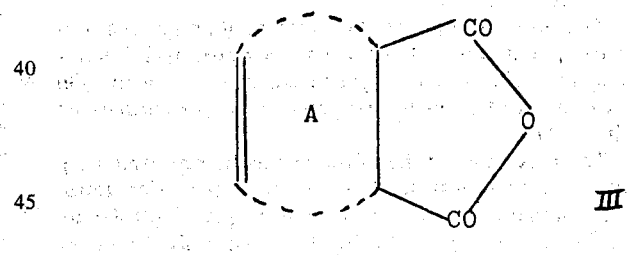

in a substantially anhydrous medium. The product of formula I may be isolated from the reaction mixture or may be further reacted without prior isolation.

The reaction is generally conducted without any external heat being applied and generally results in only the monoester being formed.

Preferably substantially equimolar amounts of alcohol and acid are in the mixture, although the reaction may be carried out with one of the reactants present in excess. Thus it may sometimes be convenient to react two molar proportions of the alcohol with one molar proportion of the acid whereby the reaction product (formula I) exists as a solution in the excess alcohol and then to react further both these bodies either (a) by raising the temperature of the mixture so that they react further with each other or (b) by adding an additional reactive component capable of interaction with hydroxyl and/or carboxyl radicals.

The anhydrous medium may consist solely of the reactants but preferably the medium comprises an inert organic solvent, such as an aromatic hydrocarbon, for example benzene or toluene, or xylene, or a chlorinated hydrocarbon, such as carbon tetrachloride or tetrochloro ethane.

The halogen or hydrogen halide should be introduced into the reaction mixture in substantially anhydrous form, and may be introduced as a solution in inert solvent if one is to be present in the reaction mixture.

Upon addition of the halogen to the reaction mixture, an exotherm is produced and this exotherm is used to provide the heat necessary to carry out the esterification reaction substantially simultaneously with the addition of the halogen, or hydrogen halide, at the double bond. Particular merit of the above system is that it is a single-stage reaction process, wherein there is simultaneous esterification and halogenation proceeding.

The reaction can be carried out over a wide range of temperatures depending upon the solvent and alcohol being used. Temperatures of 20° to 120°C. are generally preferred. In order to maintain the temperature at the desired optimum, it may be necessary to cool or to add the halogen or hydrogen halide slowly.

The following are examples of the invention.

EXAMPLE 1

608 Parts of tetrahydro phthalic anhydride and 248 parts of monoethylene glycol are suspended in 400 parts of toluene. 640 Parts of bromine is slowly added, while the mixture is stirred, at such a rate that the temperature is maintained in the range 80°–85°C. The bromine is fairly rapidly absorbed, the addition being complete within 1 to 2 hours. Vacuum is then applied to the reaction mixture so that the toluene distils at a steady rate. The vacuum is increased as the reaction mixture cools until all the solvent has been removed. The product, amounting to 1400 parts, is obtained as a viscous liquid.

The product contains the theoretical amount of bromine calculated as 4,5-dibromocyclohexane-1-(monoethylene glycol carboxylate)-2-carboxylic acid. On exposure to the air the product dries and hardens on the surface.

The procedure of the example may be repeated using other inert solvents, such as carbon tetrachloride, tetrachloroethane, xylene, or benzene in place of toluene, and it may be repeated using other alcohols, for example diethylene glycol, polyethylene glycol, propane 1,3-diol, butane 1,4-diol, butanol, hexanol, and dodecanol, all with generally similar results to those obtained in Example 1.

The preferred compounds of the invention are those in which $R_4$ represents hydroxy and which may be prepared by using a dihydroxy alcohol as the alcohol of formula II. Suitable dihydroxy alcohols are ethylene glycol and propylene glycol. The products thus obtained are halogenated hydroxy carboxylic acids and these can be homopolymerised, or more usually copolymerised with other homopolymerisable monomers, in generally conventional manner for the formation of polymers based on hydroxy carboxylic acids.

Preferably the hydroxy carboxylic acids are copolymerised with other copolymerisable materials, usually monomers, to form copolymers that have particular value by virtue of their fire resistance. Monomers that can be used for copolymerisation include dicarboxylic acids or anhydrides (for example maleic anhydride or acid), usually together with a dihydroxy compound, to form polyesters, or with isocyanates (especially aromatic isocyanates) to form polyurethanes.

EXAMPLE 2

A polymerisable blend is prepared by mixing 358 parts of the brominated hydroxy carboxylic acid prepared in Example 1 with 52 parts ethylene glycol, 32 parts diethylene glycol and 98 parts maleic anhydride. The blend is heated at 175°C. for approximately 4 hours until the acid value is less than 30, then cooled to 90°C. and inhibited with 100 ppm hydroquinone. 228 parts styrene is then added.

The blend is polymerised by addition of 1% benzoyl peroxide and heating at 100°C. for 2–3 hours.

The polyester resin formed is self-extinguishing and shows superior flame resistance when compared with conventional resins.

The polyester may be used in the manufacture of, for example, fibre reinforced panels, in castings, and in mouldings.

EXAMPLE 3

A reaction product (A) is made by heating 100 parts of the brominated hydroxy carboxylic acid prepared in Example 1 with 56 parts diethylene glycol at 175°C. for approximately 4 hours until the acid value is less than 4, then cooled to room temperature.

To 30 parts of the reaction product (A) is added 250 parts diphenyl methane diisocyanate (Caridac 30 Shell Chemicals U.K. Limited) and the mixture stirred for 30 minutes at 75°C. to give a polymer pre mix (B).

To a further 104 parts of the reaction product (A) is added with stirring 3 parts water, 4 parts silicone fluid, and 0.4 parts N-ethyl morpholine.

A polyurethane foam is prepared by stirring the polymer pre mix (B) into this mixture. After stirring for 1½ minutes, foam starts to form and becomes rigid after 6 minutes.

The prepared polyurethane foam is self-extinguishing and shows superior flame resistance when compared with a polyurethane foam containing no brominated compound.

The polyurethane may be used as insulating material for buildings.

What is claimed is:

1. A one-step simultaneous esterification and halogenation process for preparing 4,5-dihalocyclohexane-1-(monoethylene glycol carboxylate)-2-carboxylic acid which comprises reacting bromine, chlorine, iodine, hydrogen bromide, hydrogen chloride, or hydrogen iodide with a mixture of tetrahydrophthalic anhydride and monoethylene glycol in a substantially anhydrous medium.

2. The process of claim 1 wherein the amounts of the anhydride and the glycol are substantially equimolar.

3. The process of claim 1 wherein the reaction is carried out in an inert organic solvent.

* * * * *